US012528099B2

(12) United States Patent
Aoki

(10) Patent No.: US 12,528,099 B2
(45) Date of Patent: Jan. 20, 2026

(54) LIQUID DISCHARGE APPARATUS AND LIQUID DISCHARGE METHOD

(71) Applicant: Kento Aoki, Kanagawa (JP)

(72) Inventor: Kento Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/351,144

(22) Filed: Jul. 12, 2023

(65) Prior Publication Data

US 2024/0033767 A1 Feb. 1, 2024

(30) Foreign Application Priority Data

Jul. 28, 2022 (JP) ................................ 2022-120434
Apr. 3, 2023 (JP) ................................ 2023-059701

(51) Int. Cl.
*B08B 3/02* (2006.01)
*B05B 15/555* (2018.01)
*B08B 3/04* (2006.01)

(52) U.S. Cl.
CPC .............. *B05B 15/555* (2018.02); *B08B 3/02* (2013.01); *B08B 3/04* (2013.01)

(58) Field of Classification Search
CPC .. B08B 3/02; B08B 3/04; B05B 15/50; B05B 15/52; B05B 15/55; B05B 15/555; B05B 15/557; B41J 2/16517; B41J 2/16552; B41J 2002/16555; B41J 2002/1657; B41J 2002/16579; B41J 29/17; B41J 29/393; B41J 29/3935
See application file for complete search history.

(56) References Cited

U.S. PATENT DOCUMENTS

2006/0050102 A1 3/2006 Kojima
2018/0266415 A1* 9/2018 Afshari .................. F15B 15/18
2023/0191777 A1 6/2023 Sugiura et al.
2023/0191786 A1* 6/2023 Lee ......................... B41J 2/125
347/14

FOREIGN PATENT DOCUMENTS

| | | | |
|---|---|---|---|
| CN | 1762707 | A | 4/2006 |
| CN | 1941282 | A | 4/2007 |
| CN | 210546582 | U | 5/2020 |
| CN | 215306889 | U | 12/2021 |
| CN | 216033220 | U | 3/2022 |
| CN | 114334759 | A | 4/2022 |

(Continued)

OTHER PUBLICATIONS

Machine Translation of Kojima, JP-2006205742-A, Aug. 2006. (Year: 2006).*

(Continued)

*Primary Examiner* — David G Cormier
(74) *Attorney, Agent, or Firm* — Harness, Dickey & Pierce, P.L.C.

(57) ABSTRACT

A liquid discharge apparatus includes a liquid discharge head, a second medium, and a cleaner. The liquid discharge head discharges a liquid on the first medium. The second medium is different from the first medium. The liquid discharge head is dischargeable the liquid onto the second medium to form a test pattern. The cleaner cleans the second medium to remove the test pattern from the second medium.

15 Claims, 15 Drawing Sheets

(56) References Cited

FOREIGN PATENT DOCUMENTS

| | | | | |
|---|---|---|---|---|
| DE | 102013109345 | A1 * | 3/2014 | ............... B08B 3/02 |
| JP | 6-191047 | | 7/1994 | |
| JP | 6-226982 | | 8/1994 | |
| JP | 2000-094655 | | 4/2000 | |
| JP | 2006-205742 | A | 8/2006 | |
| JP | 2008-073878 | | 4/2008 | |
| JP | 2010-234773 | A | 10/2010 | |
| JP | 2010-247142 | | 11/2010 | |
| JP | 2013208874 | A | 10/2013 | |
| JP | 2023-093106 | | 7/2023 | |
| KR | 20110013917 | A | 2/2011 | |

OTHER PUBLICATIONS

Machine Translation of Ozeki et al, DE-102013109345-A1, Mar. 2014. (Year: 2014).*

Extended European Search Report dated Dec. 6, 2023 for corresponding European Patent Application No. 23187563.4.

Office Action issued Oct. 25, 2025 in Chinese Application No. 202310684649.9.

* cited by examiner

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application Nos. 2022-120434, filed on Jul. 28, 2022, and 2023-059701, filed on Apr. 3, 2023, in the Japan Patent Office, the entire disclosure of each of which is hereby incorporated by reference herein.

BACKGROUND

Technical Field

Embodiments of the present disclosure relate to a liquid discharge apparatus and a liquid discharge method.

Related Art

In the related art, a print head prints a test pattern on a test recording medium, and a sensor captures an image of a column of ink drops in the test pattern as a group. An average area, an edge position, and a center-to-center distance of the ink drops are calculated by image processing. Whether ink discharge is normal or abnormal is determined based on the calculated result to detect a defective inkjet nozzle.

SUMMARY

Embodiments of the present disclosure describe an improved liquid discharge apparatus that includes a liquid discharge head, a second medium, and a cleaner. The liquid discharge head discharges a liquid on the first medium. The second medium is different from the first medium. The liquid discharge head is dischargeable the liquid onto the second medium to form a test pattern. The cleaner cleans the second medium to remove the test pattern from the second medium.

According to another embodiment of the present disclosure, there is provided a liquid discharge method including discharging a liquid on a first medium, discharging the liquid on a second medium different from the first medium to form a test pattern, and cleaning the second medium to remove the test pattern from the second medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
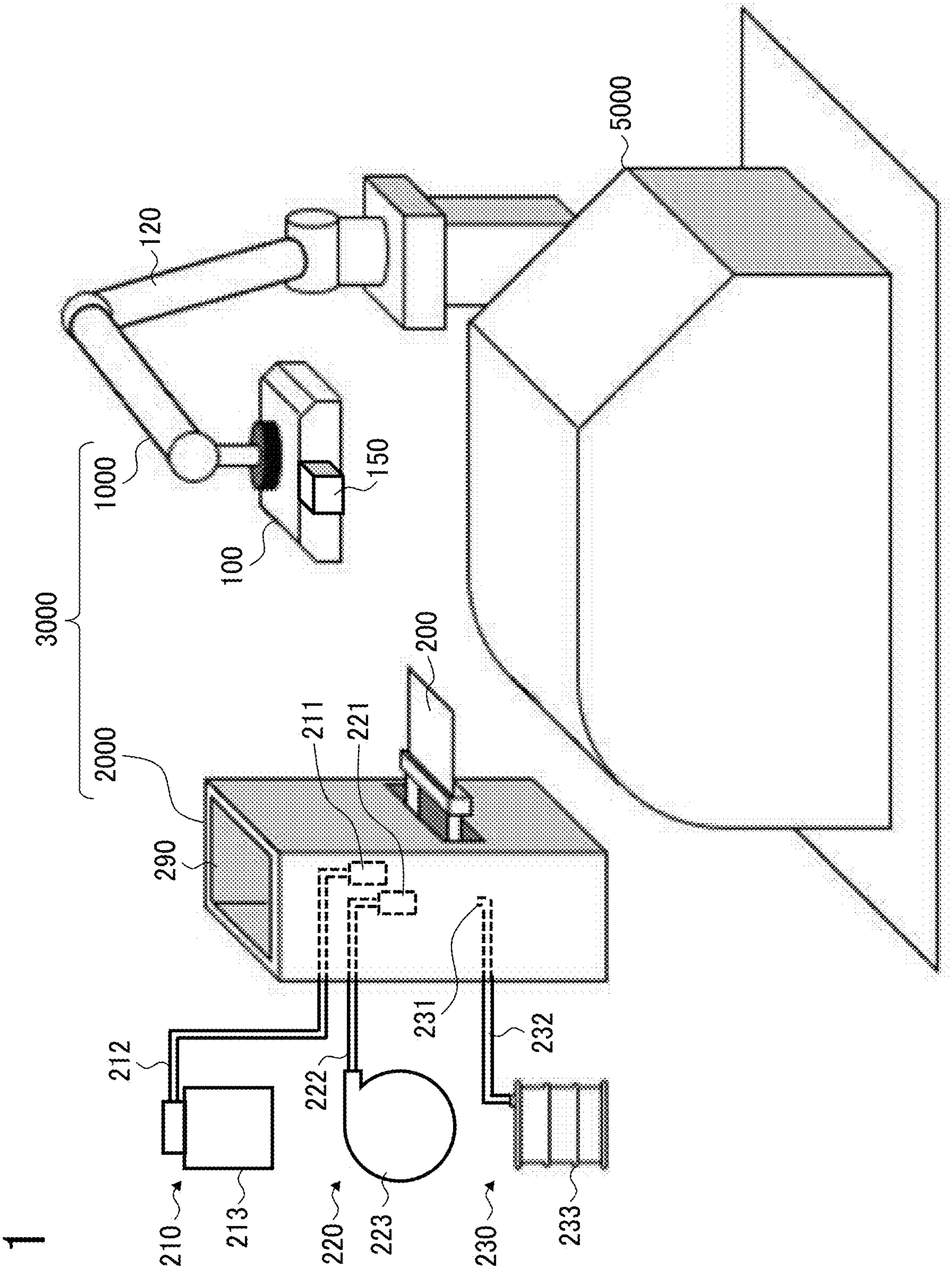
FIG. 1 is a schematic perspective view of a liquid discharge apparatus according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the description of the drawings, the same elements are denoted by the same reference codes and redundant descriptions thereof are omitted below.

Outline of Liquid Discharge Apparatus

An outline of a liquid discharge apparatus is described with reference to FIG. 1.

FIG. 1 is a schematic perspective view of a liquid discharge apparatus according to an embodiment of the present disclosure. The liquid discharge apparatus illustrated in FIG. 1 is a coating apparatus 3000 that coats, for example, a body of an automobile. The coating apparatus 3000 includes a liquid discharge device 1000 and a maintenance device 2000, and is installed in a predetermined coating booth, for example.

The liquid discharge device 1000 is, for example, a multi-articulated robot including a robot arm 120 and a liquid discharge head 100 attached to a distal end of the robot arm 120. The liquid discharge head 100 is referred to as a head 100 in the following description. The liquid discharge device 1000 can freely move the head 100 relative to an object 5000 (an example of a first medium) such as the body of the automobile to accurately position the head 100 at a coating position of the object 5000. The head 100 positioned at the coating position discharges ink, which is an example of a liquid, toward the object 5000 to coat the object 5000 with the ink. The head 100 includes a camera sensor 150 which is an example of a detector. The camera sensor 150 detects a test pattern which is described later.

The maintenance device 2000 is installed in a region where the robot arm 120 is movable. The head 100 moves to the maintenance device 2000 before the start of ink discharge, after the end of the ink discharge, or when a predetermined time has elapsed in a coating operation. The maintenance device 2000 includes a medium plate 200, a cleaning mechanism 210, a drying mechanism 220, a drainage mechanism 230, and a head maintenance mechanism 290. The medium plate 200 is an example of a second medium (recording medium).

The medium plate 200 is typically made of a plate having good cleanability. The medium plate 200 is movable between a position exposed to the outside of the maintenance device 2000 (i.e., an exposed position) and a position retracted inside the maintenance device 2000 (i.e., a retracted position) as illustrated in the drawings. The details of the medium plate 200 are described later. The head 100 discharges ink to the medium plate 200 at the exposed position outside the maintenance device 2000 to form the test pattern on a surface of the medium plate 200.

The cleaning mechanism 210 includes a cleaning liquid nozzle 211 and a cleaning liquid supply path 212. The cleaning liquid nozzle 211 is installed inside the maintenance device 2000. The cleaning liquid supply path 212 connects the cleaning liquid nozzle 211 and a cleaning liquid storage 213 installed outside the maintenance device 2000. The cleaning mechanism 210 sprays (supplies) a cleaning liquid from the cleaning liquid nozzle 211 to the medium plate 200 retracted inside the maintenance device 2000 to clean the medium plate 200. The cleaning mechanism 210 is an example of a cleaner or a removal device. The cleaning liquid is appropriately selected from pure water, an aqueous cleaning liquid, a solvent, and a mixture thereof based on various conditions such as the type of ink (liquid) used in the head 100 and environmental compatibility.

The drying mechanism 220 includes an air nozzle 221 and an air supply path 222. The air nozzle 221 is installed inside the maintenance device 2000. The air supply path 222 connects the air nozzle 221 and an air supply device 223 installed outside the maintenance device 2000. The drying mechanism 220 blows air from the air nozzle 221 onto the medium plate 200 retracted inside the maintenance device 2000 to dry the medium plate 200 after cleaning.

The drainage mechanism 230 includes a drain port 231 and a drain path 232. The drain port 231 is disposed inside the maintenance device 2000. The drain path 232 connects the drain port 231 and a drain container 233 installed outside the maintenance device 2000. The drainage mechanism 230 drains the cleaning liquid used for cleaning the medium plate 200 from the drain port 231 to the drain container 233.

The head maintenance mechanism 290 performs maintenance and recovery operations such as nozzle suction and nozzle cleaning on a nozzle face of the head 100 to maintain discharge quality of the head 100. A nozzle from which ink is discharged is formed on the nozzle face of the head 100. The head maintenance mechanism 290 is not limited to a configuration integrally provided with the maintenance device 2000. For example, the head maintenance mechanism 290 may be provided separately from the maintenance device 2000, and the head maintenance mechanism 290 and the maintenance device 2000 may be installed adjacent to each other.

As described above, the coating apparatus 3000 as a liquid discharge apparatus according to the present embodiment includes the removal device that removes the test pattern formed on the medium plate 200 from the medium plate 200. The removal device includes the cleaning mechanism 210 that supplies the cleaning liquid to the medium plate 200 to clean the medium plate 200. The coating apparatus 3000 as a liquid discharge apparatus according to the present embodiment further includes the drying mechanism 220 that dries the medium plate 200 cleaned by the cleaning mechanism 210.

Thus, the same medium plate 200 can be reused to detect the test pattern. As a result, the medium plate 200 is not discarded after the test pattern is detected, resulting in cost saving for the medium plate 200. In addition to the cost saving described above, the reuse of the medium plate 200 may enhance a detection accuracy of the test pattern. If the medium plate is discarded after use, preferably, an expensive material is not used for the medium plate 200. In the present embodiment, since the medium plate 200 can be reused, the same material as the material of the object 5000 to be coated or a material similar to the material of the object 5000 can be used for the medium plate 200. As a result, a discharge state of ink can be determined based on the test pattern formed under a condition equivalent to that of the actual surface of the object 5000 to be coated, thereby enhancing the detection accuracy of the test pattern.

Hardware Configuration of Liquid Discharge Apparatus

A description is given below of a hardware configuration of the liquid discharge apparatus according to the present embodiment with reference to FIG. 2. Components may be added to or removed from the hardware configuration illustrated in FIG. 2, if desired.

Figure 2:
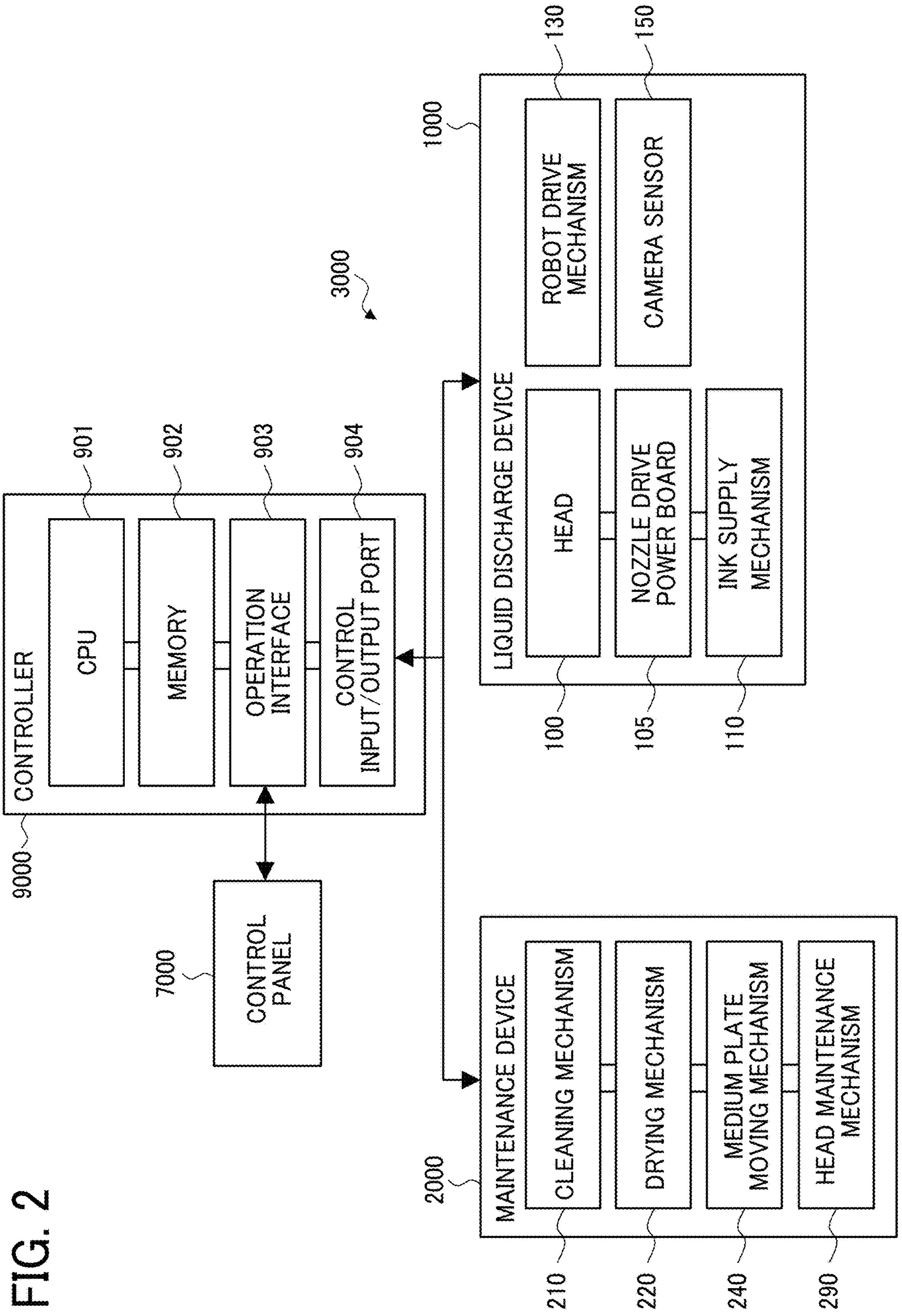
FIG. 2 is a block diagram illustrating a hardware configuration of the liquid discharge apparatus according to embodiments of the present disclosure.

FIG. 2 is a block diagram illustrating the hardware configuration of the liquid discharge apparatus according to the present embodiment. The coating apparatus 3000 includes the liquid discharge device 1000, the maintenance device 2000, a controller 9000, and a control panel 7000. The controller 9000 includes a central processing unit (CPU) 901, a memory 902, an operation interface 903, a control input/output port 904, and the like.

The CPU 901 controls the entire coating apparatus 3000. The CPU 901 is an arithmetic device that loads a program or data stored in memory 902 and executes processing to implement functions of the coating apparatus 3000. The memory 902 stores the program or the data for implementing the respective functions. The operation interface 903 is an interface for transmitting and receiving characters, numerals, and various instructions to and from the control panel 7000. The operation interface 903 controls display of various types of information such as a cursor, a menu, a window, characters, and an image on the control panel 7000. The control input/output port 904 is a port for inputting and outputting instructions for controlling the respective devices to and from the respective devices such as the liquid discharge device 1000 and the maintenance device 2000.

The control panel 7000 includes a touch panel, for example. The control panel 700 is an example of an input device for inputting characters, numerals, and various instructions, selecting or executing the various instructions, selecting an object to be coated, moving a cursor, or the like. The control panel 7000 displays various types of information, such as a cursor, a menu, a window, characters, and an image. The controller 9000 is an example of circuitry.

The liquid discharge device 1000 includes the head 100, a nozzle drive power board 105, an ink supply mechanism 110, a robot drive mechanism 130, and the camera sensor 150. The head 100 discharges ink from the nozzles. The nozzle drive power board 105 drives the nozzles of the head 100 based on an instruction from the controller 9000 to discharge ink from the nozzles.

The ink supply mechanism 110 stores ink used for coating and supplies the ink to the head 100 based on an instruction from the controller 9000. The robot drive mechanism 130 moves the robot arm 120 based on an instruction from the controller 9000 and positions the head 100 attached to the distal end of the robot arm 120 at a predetermined position. The camera sensor 150 is attached to the head 100, for example. The camera sensor 150 captures an image of the test pattern formed on the medium plate 200 based on an instruction from the controller 9000.

The maintenance device 2000 includes the cleaning mechanism 210, the drying mechanism 220, a medium plate moving mechanism 240, and the head maintenance mechanism 290. The cleaning mechanism 210 supplies the cleaning liquid to the medium plate 200 based on an instruction from the controller 9000 to clean the medium plate 200. The drying mechanism 220 blows air onto the medium plate 200, which has been cleaned by the cleaning mechanism 210, based on an instruction from the controller 9000 to dry the medium plate 200.

The medium plate moving mechanism 240 includes a moving device that moves the medium plate 200 between the exposed position at which the medium plate 200 is exposed to the outside of the maintenance device 2000 and the retracted position at which the medium plate 104 is retracted inside the maintenance device 2000 to move the medium plate 104 based on an instruction from the controller 9000.

The head maintenance mechanism 290 includes a device that performs the maintenance and recovery operations such as the nozzle suction and the nozzle cleaning on the nozzle face of the head 100 to maintain and recover the head 100 based on an instruction from the controller 9000, thereby maintaining the discharge quality of the head 100.

The coating apparatus 3000 determines the discharge state of ink when the discharge quality of the ink discharged from the nozzles is a concern or before the start of the ink discharge (the coating operation). Examples of when the discharge quality of the ink is a concern include when ink may not be discharged from some of the nozzles for a long time, and when ink having a time limit for continuous discharge due to ink characteristics is continuously discharged for a time close to the time limit.

In the functions described in the above embodiments, a portion of each function executed by the controller 9000 can be implemented by one or more processing circuits. The term "processing circuit or circuitry" includes a programmed processor to execute each function by software, such as the CPU 901 implemented by an electronic circuit, and devices, such as an application specific integrated circuit (ASIC), a digital signal processor (DSP), a field programmable gate array (FPGA), and conventional circuit components arranged to perform the recited functions.

Figure 3:
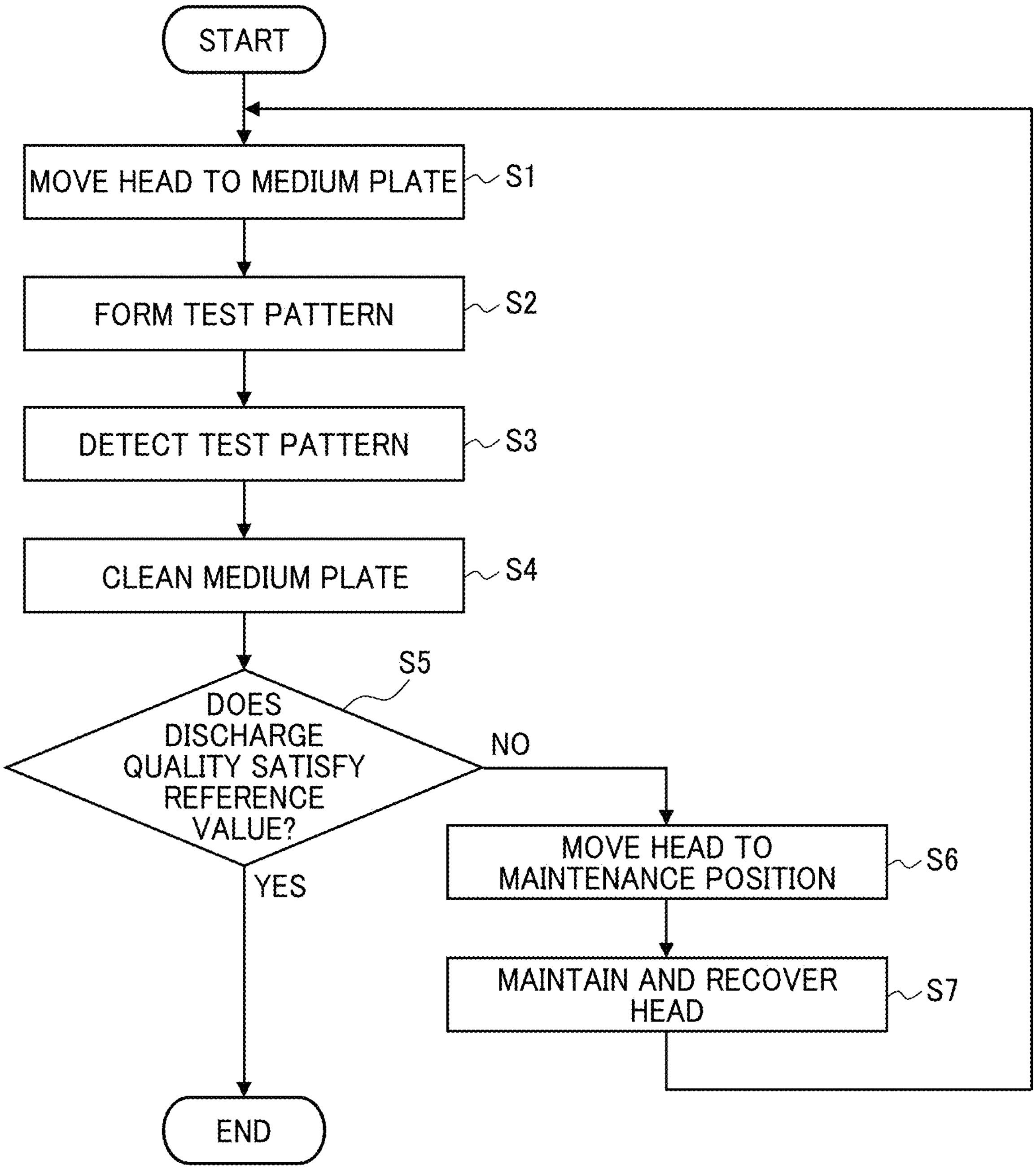
FIG. 3 is a flowchart illustrating an example of determination of a discharge state of a head of the liquid discharge apparatus.

The determination of the discharge state is described below with reference to FIG. 3. FIG. 3 is a flowchart illustrating an example of the determination of the discharge state of ink. When the discharge quality of the ink is a concern or before the start of the coating operation, the medium plate 200 is positioned at the exposed position outside the maintenance device 2000 as illustrated in FIG. 1, and the head 100 is moved to a position facing the surface of the medium plate 200 (step 51). The head 100 discharges ink from the nozzles to form the test pattern on the surface of the medium plate 200 (step S2).

The camera sensor 150 attached to the head 100 detects the test pattern formed on the medium plate 200 (step S3). In step S3, the liquid discharge device 1000 transmits an image of the test pattern captured by the camera sensor 150 to the controller 9000. After the camera sensor 150 detects (captures the image of) the test pattern, the medium plate 200 moves to the retracted position inside the maintenance device 2000. Then, in the maintenance device 2000, the cleaning mechanism 210 cleans the medium plate 200, and the drying mechanism 220 dries the medium plate 200, thereby removing the test pattern from the medium plate 200. Thus, the medium plate 200 from which the test pattern is removed is reusable for the next determination of the discharge state.

The controller 9000 processes the captured image of the test pattern received from the liquid discharge device 1000 to determine the discharge state (step S5). In the determination of the discharge state, for example, the controller 9000 calculates a discharge amount of ink (liquid droplet) based on a thickness of a line of the test pattern, and calculates a bending amount of ink (liquid droplet) based on a position of the line of the test pattern. The controller 9000 compares these calculated values with a range of reference values defined in advance by quality evaluation to determine whether or not the discharge quality satisfies the reference values.

In step S5, when the controller 9000 determines that the discharge quality satisfies the reference values (Yes in step S5), the controller 9000 finishes the determination of the discharge state and causes the liquid discharge device 1000 to start coating the object 5000 with ink. In step S5, when the controller 9000 determines that the discharge quality does not satisfy the reference values (No in step S5), the controller 9000 causes the head 100 to move to the head maintenance mechanism 290 (step S6).

After that, the head maintenance mechanism 290 performs the maintenance and recovery operations, or a discharge complementation operation on the head 100 to enhance the discharge quality (step S7). After the head maintenance mechanism 290 finishes the maintenance and recovery operations in step S7, the process returns to step S1 to determine the discharge state again.

The order of the steps of the determination of the discharge state illustrated in FIG. 3 is an example and is not limited thereto. For example, the order of step S4 (medium plate cleaning) and step S5 (determination of the discharge state) may be reversed, and the medium plate 200 may be cleaned after the determination of the discharge state. After step S3 (test pattern detection), step S4 and step S5 may be performed in parallel.

The determination of the discharge state is performed, but not limited to, when the discharge quality of the ink is a concern, such as when ink may not be discharged from some of the nozzles for a long time, and when the elapsed time for continuous discharge approaches the time limit. In the determination of the discharge state, for example, the camera sensor 150 may capture an image of an actual coated surface of the object 5000, and captured image data by the camera sensor 150 may be used for determining the discharge state.

Head Maintenance Mechanism

Figure 4A:
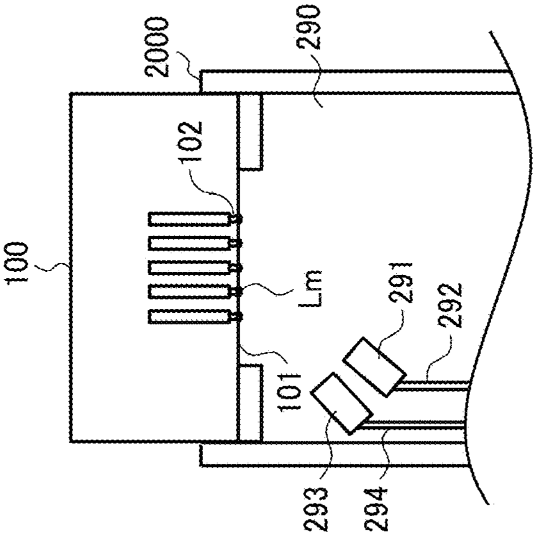
FIGS. 4A to 4C are schematic views of a head maintenance mechanism of the liquid discharge apparatus.
Figure 4B:
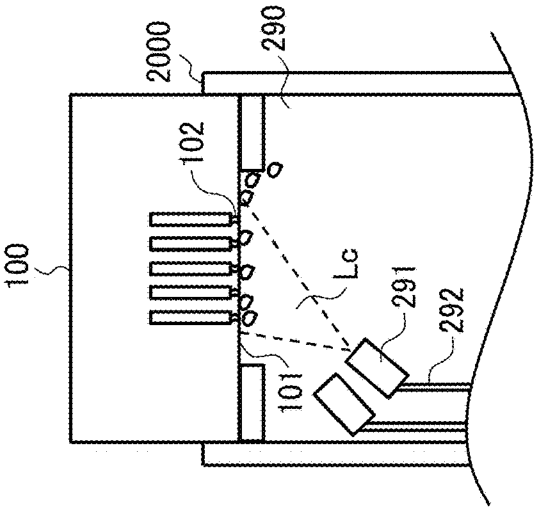
Figure 4C:
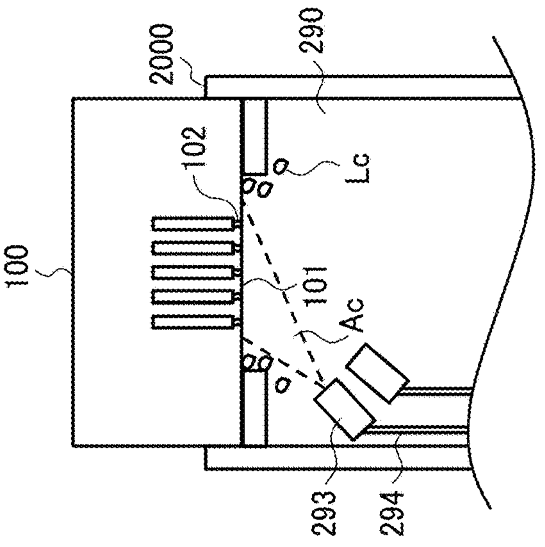

A configuration of the head maintenance mechanism 290 is described below with reference to FIGS. 4A to 4C. FIGS. 4A to 4C are schematic views of the head maintenance mechanism 290. When the controller 9000 determines to maintain the head 100, such as No in step S5 (the determination of the discharge state) of the flowchart illustrated in FIG. 3, the head 100 moves to the head maintenance mechanism 290. The head 100 moved to the head maintenance mechanism 290 is set such that a head nozzle face 101 (referred to as a nozzle face 101 in the following description) faces the head maintenance mechanism 290 as illustrated in FIG. 4A.

The head maintenance mechanism 290 includes a cleaning liquid nozzle 291, a cleaning liquid supply path 292, an air nozzle 293, an air supply path 294, and the like. The head maintenance mechanism 290 sprays the cleaning liquid supplied through the cleaning liquid supply path 212 toward the nozzle face 101 from the cleaning liquid nozzle 211 to remove foreign substances Lm (e.g., thickened ink, adhered matter, or the like) adhering to the nozzle face 101. The head maintenance mechanism 290 blows air supplied through the air supply path 294 toward the nozzle face 101 from the air nozzle 293 to dry the nozzle face 101 after being cleaned with the cleaning liquid.

FIG. 4B is a schematic view of the head maintenance mechanism 290 cleaning the nozzle face 101 with the cleaning liquid. The head maintenance mechanism 290 sprays a cleaning liquid Lc from the cleaning liquid nozzle 291 toward the nozzle face 101 to wash away the foreign substances Lm adhering to the nozzle face 101 and head nozzles 102 (referred to as nozzles 102 in the following description). Then, as illustrated in FIG. 4C, the head maintenance mechanism 290 blows air Ac from the air nozzle 293 toward the nozzle face 101 to blow off the cleaning liquid Lc remaining on the nozzle face 101 and the nozzles 102.

The head maintenance mechanism 290 is not limited to a configuration integrally provided for the maintenance device 2000. The head maintenance mechanism 290 may be provided separately from the maintenance device 2000 and may be disposed adjacent to the maintenance device 2000.

The cleaning liquid supply path 292 of the head maintenance mechanism 290 may share a part of path with the cleaning liquid supply path 212 of the cleaning mechanism 210 for the medium plate 200. Similarly, the air supply path 294 may share a part of path with the air supply path 222 of the drying mechanism 220 for the medium plate 200. In other words, the head maintenance mechanism 290 may share at least one of the cleaning liquid supply path 212 of the cleaning mechanism 210, the air supply path 222 of the drying mechanism 220, or the drain path 232 of the drainage mechanism 230 with the removal device. Such a configuration can reduce the size and cost of the maintenance device 2000.

A cleaning method of the head 100 by the head maintenance mechanism 290 and a cleaning method of the medium plate 200 by the cleaning mechanism 210 of the maintenance device 2000 may be the same method. As a result, the cleaning liquid nozzle 211 and the cleaning liquid nozzle 291 have commonality of components, thereby simplifying a configuration of the maintenance device 2000.

In the present embodiment, the head maintenance mechanism 290 includes the mechanism that cleans the nozzle face 101 and the mechanism that dries the nozzle face 101, but a mechanism that maintains and recovers the head 100 is not limited thereto. In addition to the above mechanism, examples of the mechanism that maintains and recovers the head 100 include a mechanism that sucks the nozzles 102 (i.e., a capping mechanism), a mechanism that wipes the nozzle face 101 (i.e., a wiping mechanism), and a mechanism that scrapes the nozzle face 101 (i.e., a scraping mechanism). The head maintenance mechanism 290 may appropriately include mechanisms selected from the above mechanisms.

Details of Maintenance Device

The maintenance device 2000 is described below in detail.

First Embodiment

The maintenance device 2000 according to a first embodiment is described with reference to FIGS. 5A to 5C. In the first embodiment, the medium plate 200 is movable between the exposed position at which the medium plate 200 is exposed to the outside of the maintenance device 2000 as illustrated in FIG. 5A and the retracted position at which the medium plate 200 is retracted inside the maintenance device 2000 as illustrated in FIG. 5B.

Figure 5A:
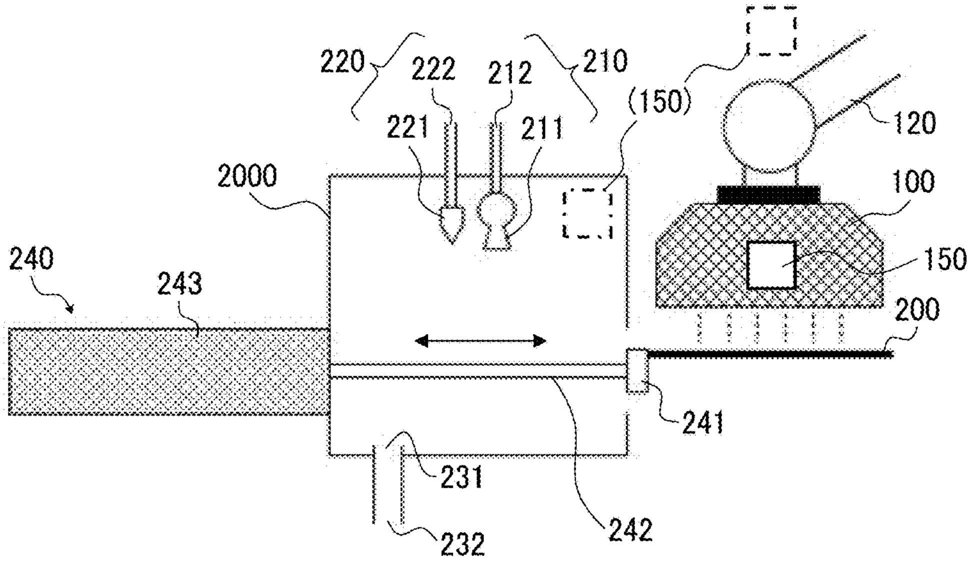
FIGS. 5A to 5C are schematic views of a maintenance device of the liquid discharge apparatus according to a first embodiment of the present disclosure.
Figure 5B:
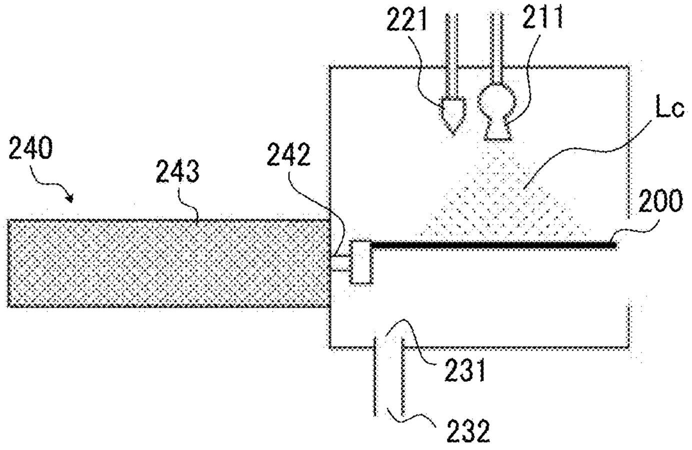
Figure 5C:
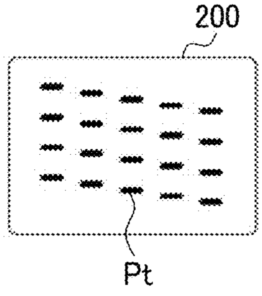

The head 100 discharges ink onto the medium plate 200 at the exposed position illustrated in FIG. 5A to form a test pattern Pt on the surface of the medium plate 200. An example of the test pattern Pt is illustrated in FIG. 5C. In other words, the exposed position at which the medium plate 200 is exposed to the outside of the maintenance device 2000 is a position at which the test pattern Pt is formed on the medium plate 200. The exposed position is an example of a "first position" or a "discharge position."

The head 100 discharges ink from each of the nozzles 102 to form the test pattern Pt including, for example, lines having a predetermined length at equal intervals. The discharge state of ink discharged from each of the nozzles 102 can be determined based on the test pattern Pt.

After the test pattern Pt is formed on the medium plate 200, the robot arm 120 moves the head 100 to a position at which the camera sensor 150 can capture an image of the test pattern Pt. The camera sensor 150 captures the image of the test pattern Pt and transmits the captured image data to the controller 9000. When the camera sensor 150 finishes transmitting the captured image data to the controller 9000, the medium plate 200 is retracted inside the maintenance device 2000 as illustrated in FIG. 5B (i.e., the retracted position).

The medium plate 200 retracted inside the maintenance device 2000 is cleaned with the cleaning liquid Lc sprayed from the cleaning liquid nozzle 211 facing the surface of the medium plate 200 on which the test pattern Pt is formed. After being cleaned with the cleaning liquid Lc, the medium plate 200 is dried by air brown from the air nozzle 221, and the medium plate 200 is moved to the exposed position illustrated in FIG. 5A again. In other words, the retracted position at which the medium plate 200 is retracted inside the maintenance device 2000 is a position at which the test pattern Pt is removed from the medium plate 200. The retracted position is an example of a "second position" or a "cleaning position."

As described above, the cleaning mechanism 210 includes the cleaning liquid nozzle 211 from which the cleaning liquid is sprayed onto the surface of the medium plate 200. The drying mechanism 220 includes the air nozzle 221 from which air is blown onto the surface of the medium plate 200. Thus, each time the camera sensor 150 has captured the image of the test pattern Pt, the test pattern Pt is removed from the medium plate 200. As a result, the medium plate 200 can be reused.

In the present embodiment, the camera sensor 150 is disposed, but not limited to, adjacent to the head 100. For example, the camera sensor 150 may be stationarily secured above the robot arm 120 as indicated by a broken line in FIG. 5A. In this case, after the robot arm 120 is retracted from above the medium plate 200, the camera sensor 150 starts capturing an image of the test pattern Pt. Alternatively, the camera sensor 150 may be disposed inside the maintenance device 2000 as indicated by a dashed dotted line in FIG. 5A. In this case, the camera sensor 150 preferably has a waterproof structure. With such a configuration, since the camera sensor 150 can capture an image in the closed space of the maintenance device 2000, an illumination condition is stabilized, which may cause an advantage in imaging quality.

The camera sensor 150 may not only detect the test pattern Pt but also capture an image indicating a moving state, a cleaning state, or a drying state of the medium plate 200. With such a configuration, the coating apparatus 3000 performs a failure prevention process such as re-operation, re-cleaning, re-drying, or error stop based on the detection result of the camera sensor 150, thereby enhancing a reliability of the coating apparatus 3000.

The medium plate moving mechanism 240 moves the medium plate 200. The medium plate moving mechanism 240 includes a medium plate holder 241, a movable portion, and a driver. Examples of the movable portion include a piston 242 which is described later with reference to FIG. 6, and examples of the driver include a cylinder 243 which is described later with reference to FIG. 6. The medium plate holder 241 holds the medium plate 200. One end of the movable portion is coupled to the medium plate holder 241 to movably support the medium plate holder 241 as indicated by a double-headed arrow in FIG. 5A relative to the driver. The driver transmits driving force to the movable portion to move the movable portion in the direction indicated by the double-headed arrow in FIG. 5A.

The configuration of the medium plate moving mechanism 240 is not particularly limited as long as the medium plate moving mechanism 240 can move the medium plate 200 between the exposed position at which the medium plate 200 is exposed to the outside of the maintenance device 2000 and the retracted position at which the medium plate 200 is retracted inside the maintenance device 2000. For example, the medium plate moving mechanism 240 may be appropriately selected from a rack and pinion type, a link mechanism type, a power cylinder type, and the like.

When an explosionproof structure is unnecessary in the coating apparatus 3000, the medium plate moving mechanism 240 may use another actuator such as an electric motor. Alternatively, the medium plate moving mechanism 240 may be powered by a robot arm to move the medium plate 200. In this case, the robot arm may be the robot arm 120 to which the head 100 is attached, or another robot for moving the medium plate 200 may be provided to move the medium plate 200 with a robot arm thereof.

Figure 6:
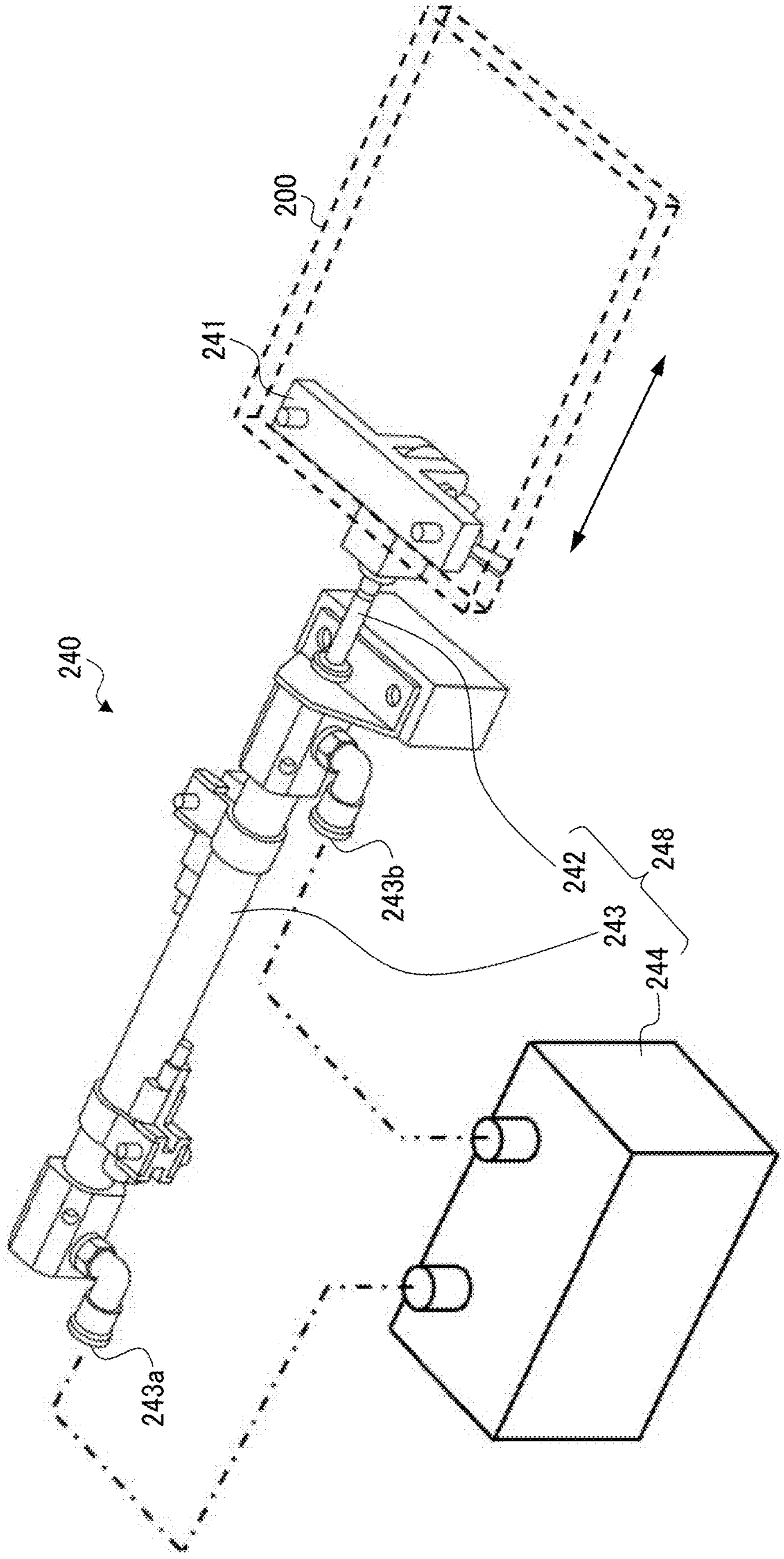
FIG. 6 is a schematic perspective view of a medium plate moving mechanism of the maintenance device.

In the first embodiment, the power cylinder type is used for the medium plate moving mechanism 240. An example of the medium plate moving mechanism 240 is described with reference to FIG. 6. FIG. 6 is a schematic perspective view of the medium plate moving mechanism 240 according to the present embodiment.

As described above, the medium plate moving mechanism 240 for moving the medium plate 200 in the direction indicated by a double-headed arrow in FIG. 6 includes a drive mechanism including a power cylinder. Various types of the power cylinders such as a pneumatic type, an oil hydraulic type, a water hydraulic type, and an electric type can be used for the power cylinder. In the present embodiment, a pneumatic power cylinder (i.e., an air cylinder 248) is used.

The air cylinder 248 illustrated in FIG. 6 is of a linear-motion type (double-acting type). The air cylinder 248 includes the piston 242 (i.e., the movable portion), the cylinder 243 (i.e., the driver), and an air electromagnetic valve 244. The cylinder 243 has two ports 243*a* and 243*b* for applying air pressure. The ports 243*a* and 243*b* are connected to the air electromagnetic valve 244.

For example, when the air electromagnetic valve 244 is turned off, air is supplied to the port 243*a* and discharged from the port 243*b*, and the medium plate moving mechanism 240 moves the piston 242 so as to push out the piston 242 relative to the cylinder 243. Contrary to the above description, when the air electromagnetic valve 244 is turned on, air is supplied to the port 243*b* and discharged from the port 243*a*, and the medium plate moving mechanism 240 moves the piston 242 so as to pull the piston 242 into the cylinder 243. The piston 242 is an example of the movable portion, and the cylinder 243 is an example of the driver.

Thus, the medium plate moving mechanism 240 turns on and off the air electromagnetic valve 244 to switch between the air supply and air discharge of the ports 243*a* and 243*b*, thereby switching the operation direction of the piston 242. The medium plate holder 241 that detachably holds the medium plate 200 is disposed at an end of the piston 242. The medium plate moving mechanism 240 is an example of the moving device.

As described above, the maintenance device 2000 includes the medium plate moving mechanism 240 that moves the medium plate 200 between the position (discharge position) at which the test pattern Pt is formed on the medium plate 200 and the position (cleaning position) at which the test pattern Pt is removed from the medium plate 200. The medium plate moving mechanism 240 includes the linear-motion air cylinder 248.

Second Embodiment

Figure 7B:
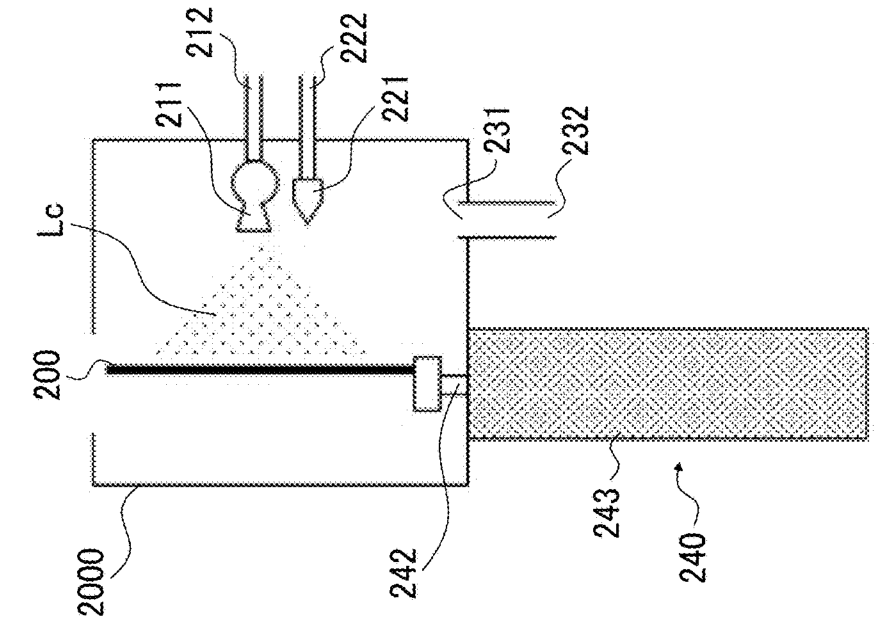
FIGS. 7A to 7B are schematic views of the maintenance device according to a second embodiment of the present disclosure.
Figure 7A:
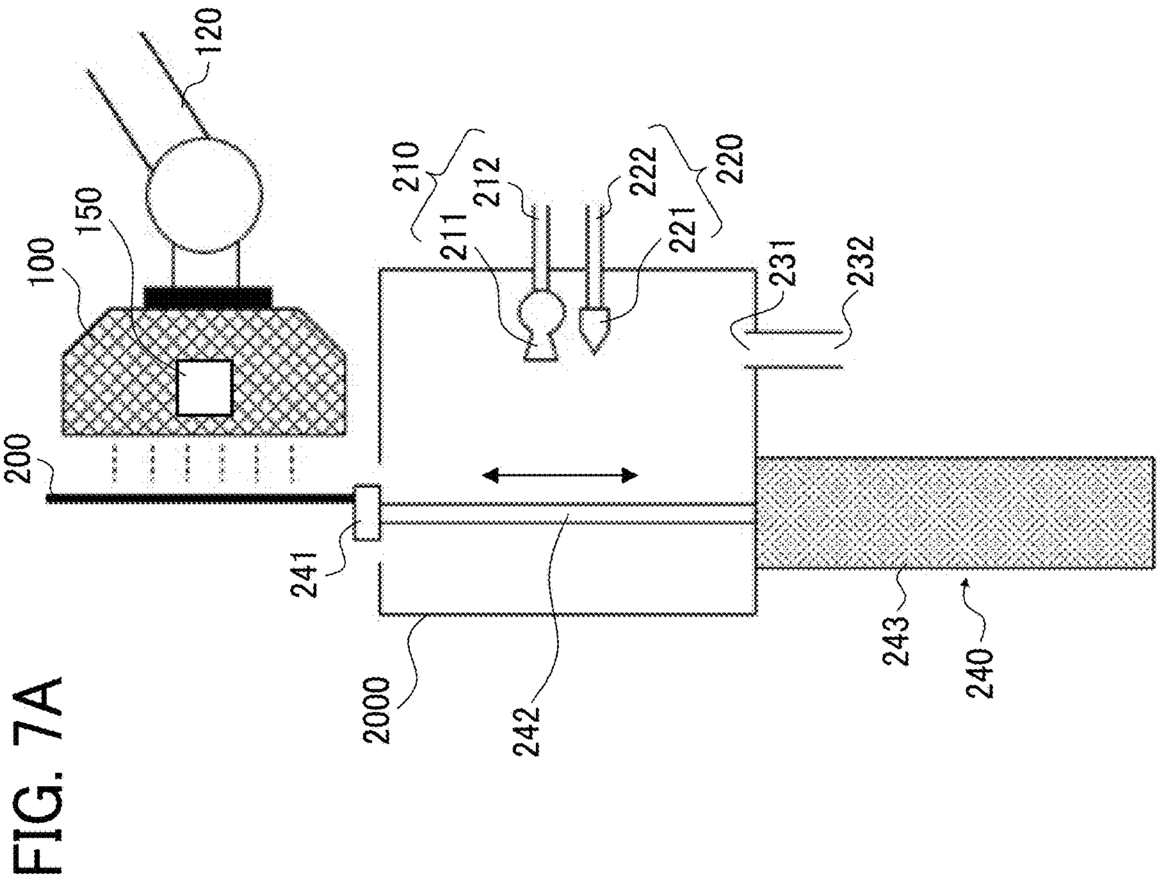

FIGS. 7A and 7B are schematic views of the maintenance device 2000 according to a second embodiment of the present disclosure. In the second embodiment, as illustrated in FIG. 7A, the head 100 discharges ink in the horizontal direction to form the test pattern Pt on the medium plate 200 at the discharge position. As illustrated in FIG. 7B, the medium plate 200 is moved to the cleaning position (i.e., the second position) in the vertical direction. These points (directions) are different from the first embodiment.

As described above, the moving direction of the medium plate 200 and the orientation of the medium plate 200 at each position are not particularly limited, and may be any direction other than the vertical direction illustrated in FIG. 7A. Also in the second embodiment, the same operation as that of the first embodiment can be performed, and the same operational effect can be obtained.

Third Embodiment

Figure 8B:
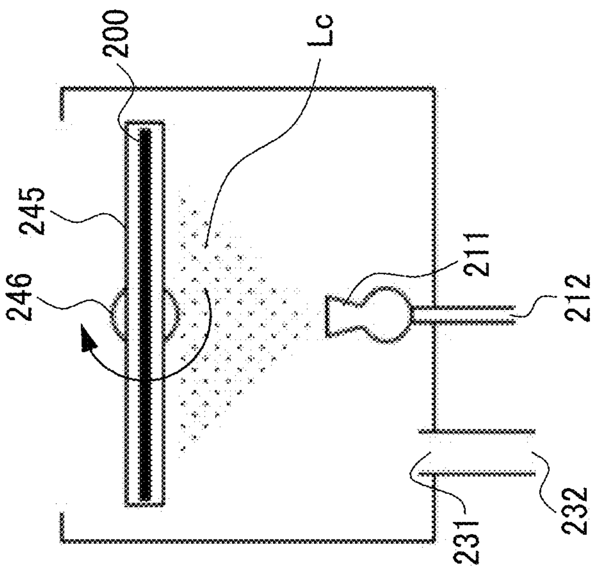
FIGS. 8A to 8B are schematic views of the maintenance device according to a third embodiment of the present disclosure.
Figure 8A:
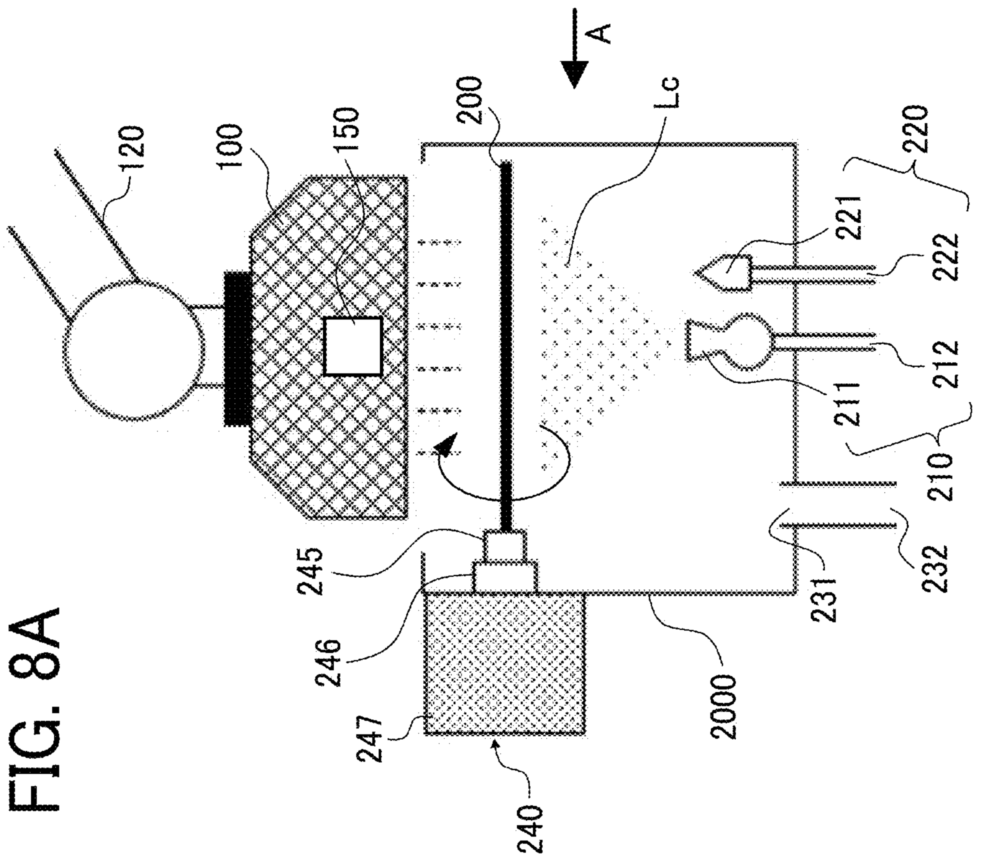

FIGS. 8A and 8B are schematic views of the maintenance device 2000 according to a third embodiment of the present disclosure. In the first and second embodiments, the position at which the test pattern is formed and the position at which the test pattern is removed are located on a straight line, and the medium plate 200 is horizontally or vertically moved between the two positions, that is, the medium plate moving mechanism 240 is of the linear-motion type. On the other hand, the third embodiment is different from the first and second embodiments in that the medium plate moving mechanism 240 is of a rotary type.

FIG. 8A is a schematic side view of the maintenance device 2000, and FIG. 8B is a schematic view of the maintenance device 2000 viewed from the direction indicated by arrow A illustrated in FIG. 8A. In the third embodiment, the medium plate 200 is not exposed to the outside of the maintenance device 2000, and the test pattern Pt is formed, at the discharge position, on and removed, at the cleaning position, from the medium plate 200 retracted inside the maintenance device 2000.

The medium plate moving mechanism 240 includes a medium plate holder 245, a rotator 246 which is an example of the movable portion, and a rotary actuator 247 which is an example of the driver. The medium plate holder 245 holds the medium plate 200. A portion of the rotator 246 is coupled to the medium plate holder 245, and the rotary actuator 247 rotates the rotator 246 in the direction indicated by curved arrows in FIGS. 8A and 8B. The rotary actuator 247 transmits driving force to the rotator 246 to rotate the rotator 246 in the direction indicated by the curved arrows in FIGS. 8A and 8B.

In the third embodiment, after the test pattern Pt is formed on the medium plate 200, the robot arm 120 moves the head 100 to the position at which the camera sensor 150 can capture an image of the test pattern Pt. The camera sensor 150 captures the image of the test pattern Pt and transmits the captured image data to the controller 9000. When the camera sensor 150 finishes transmitting the captured image data to the controller 9000, the medium plate 200 is rotated by 180 degrees, and the surface of the medium plate 200 bearing the test pattern Pt is directed to the cleaning liquid nozzle 211 and the air nozzle 221.

The medium plate 200 facing the cleaning liquid nozzle 211 and the air nozzle 221 is cleaned by the cleaning liquid Lc sprayed from the cleaning liquid nozzle 211. After being cleaned with the cleaning liquid Lc, the medium plate 200 is dried by air blown from the air nozzle 221. The medium plate moving mechanism 240 is an example of the moving device.

As described above, the medium plate moving mechanism 240 includes the rotary actuator 247 which is of the rotary type. When the test pattern Pt can be formed not only on one surface but also on both surfaces of the medium plate 200, the maintenance device 2000 according to the third embodiment can form and remove the test pattern Pt on and from each surface of the medium plate 200. Thus, the operation time to detect the test patten Pt can be reduced.

An air motor which is rotated by air may be used as the rotary actuator 247 besides an ordinary electric motor. The air cylinder 248 described in the first and second embodiments and the air motor described in the third embodiment is useful to prevent ignition of ink or the cleaning liquid used in the coating apparatus 3000 described above. Ink containing an organic solvent used for coating is likely to be ignited due to volatile components thereof. For this reason, a component that may be an ignition source or a heat generation component preferably avoid being installed in the vicinity of the head 100. The use of the air cylinder 248 or the air motor prevents the ink containing an organic solvent from being ignited.

Fourth Embodiment

Figure 9A:
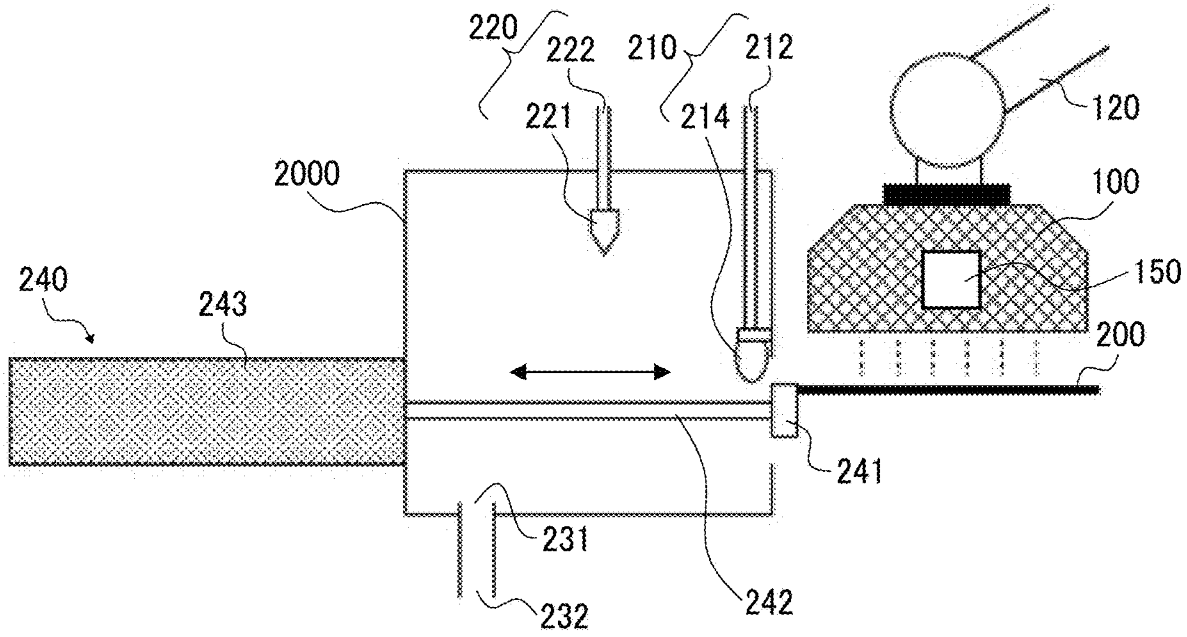
FIGS. 9A to 9B are schematic views of the maintenance device according to a fourth embodiment of the present disclosure.
Figure 9B:
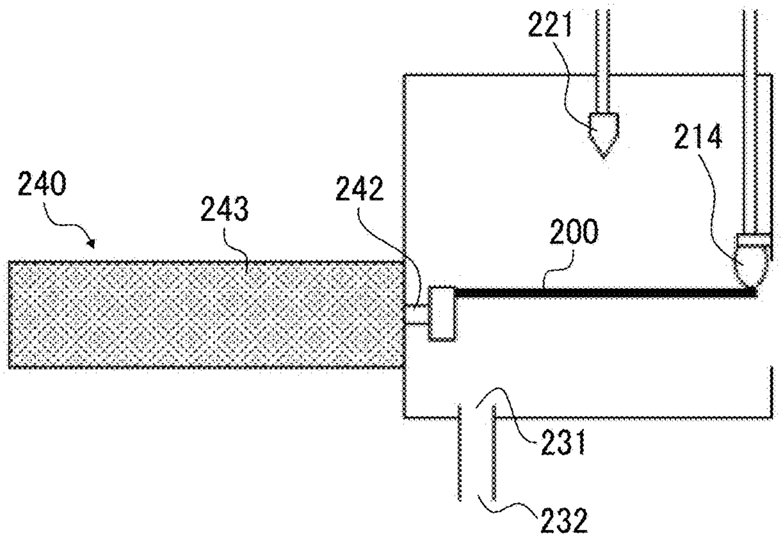

FIGS. 9A and 9B are schematic views of the maintenance device 2000 according to a fourth embodiment of the present disclosure. In the first to third embodiments, the medium plate 200 is cleaned with the cleaning liquid sprayed from the cleaning liquid nozzle 211. On the other hand, in the fourth embodiment, the maintenance device 2000 includes a cleaning-liquid-impregnated component 214 made of a material to be impregnated with the cleaning liquid at an end of the cleaning liquid supply path 212 as illustrated in FIGS. 9A and 9B.

The cleaning-liquid-impregnated component 214 has a width (a length in the direction perpendicular to the surface of the sheet on which FIGS. 9A and 9B are drawn) that covers at least an area of the medium plate 200 where the test pattern Pt is formed in a width direction of the medium plate 200. The cleaning-liquid-impregnated component 214 is disposed on the movement line of the surface of the medium plate 200 so as to contact the surface of the medium plate 200 when the medium plate 200 moves from the exposed position (the position illustrated in FIG. 9A) to the retracted position (the position illustrated in FIG. 9B).

The cleaning-liquid-impregnated component 214 is made of a material, such as a sponge, that holds a liquid. The cleaning-liquid-impregnated component 214 is rubbed against the surface of the medium plate 200 moving from the exposed position toward the retracted position to clean the medium plate 200 while applying the cleaning liquid to the surface of the medium plate 200. After being cleaned by the cleaning-liquid-impregnated component 214, the medium plate 200 is dried by air blown from the air nozzle 221 similarly to the first to third embodiments. The cleaning-liquid-impregnated component 214 is not limited to the configuration illustrated in FIGS. 9A and 9B. For example, a portion of the cleaning-liquid-impregnated component 214 in contact with the medium plate 200 may be made of a brush or may be made of a blade having a sharp edge.

As described above, in the fourth embodiment, the cleaning mechanism 210 includes the cleaning-liquid-impregnated component 214 which is impregnated with the cleaning liquid and contacts the medium plate 200.

Fifth Embodiment

Figure 10:
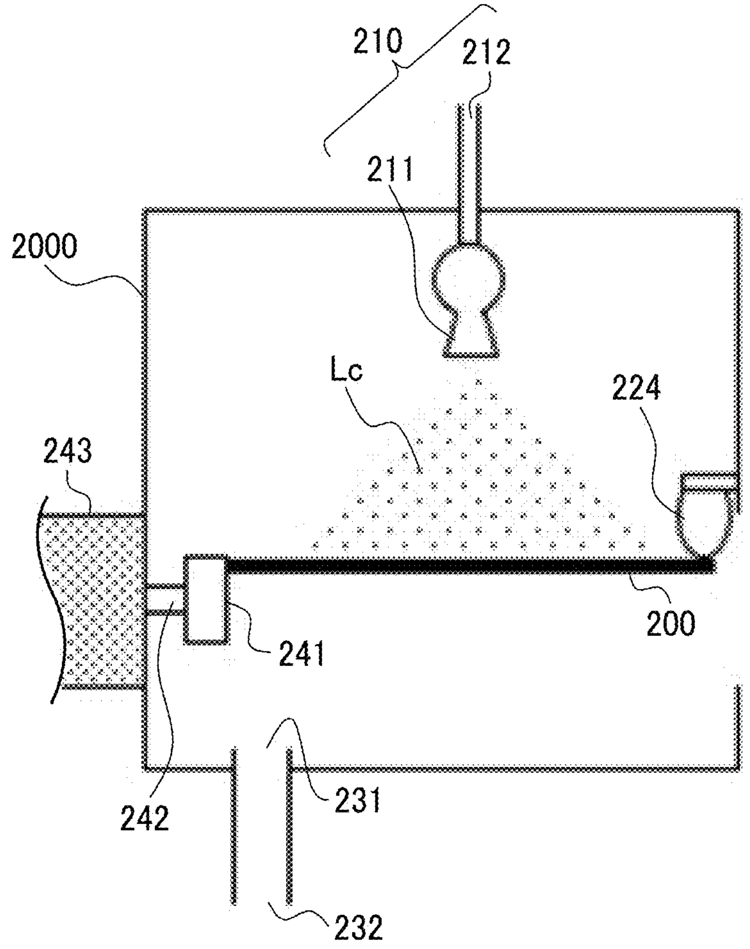
FIG. 10 is a schematic view of the maintenance device according to a fifth embodiment of the present disclosure.

FIG. 10 is a schematic view of the maintenance device 2000 according to a fifth embodiment of the present disclosure. In the first to fourth embodiments, the medium plate 200 is dried by air blown from the air nozzle 221. On the other hand, in the fifth embodiment, the maintenance device 2000 includes a cleaning liquid absorber 224 made of a material that absorbs the cleaning liquid on the movement line of the surface of the medium plate 200 as illustrated in FIG. 10.

The cleaning liquid absorber 224 has a width (a length in the direction perpendicular to the surface of the sheet on which FIG. 10 is drawn) that covers at least an area of the medium plate 200 where the test pattern Pt is formed in the width direction. The cleaning liquid absorber 224 contacts the surface of the medium plate 200 when the medium plate 200 cleaned with the cleaning liquid sprayed from the cleaning liquid nozzle 211 moves from the inside to the outside of the maintenance device 2000.

The cleaning liquid absorber 224 is rubbed against the medium plate 200 moving from the inside to the outside of the maintenance device 2000 to wipe off the cleaning liquid adhering to the surface of the medium plate 200.

As described above, in the fifth embodiment, the drying mechanism 220 includes the cleaning liquid absorber 224 that absorbs the cleaning liquid on the medium plate 200 while contacting the medium plate 200.

Sixth Embodiment

Figure 11:
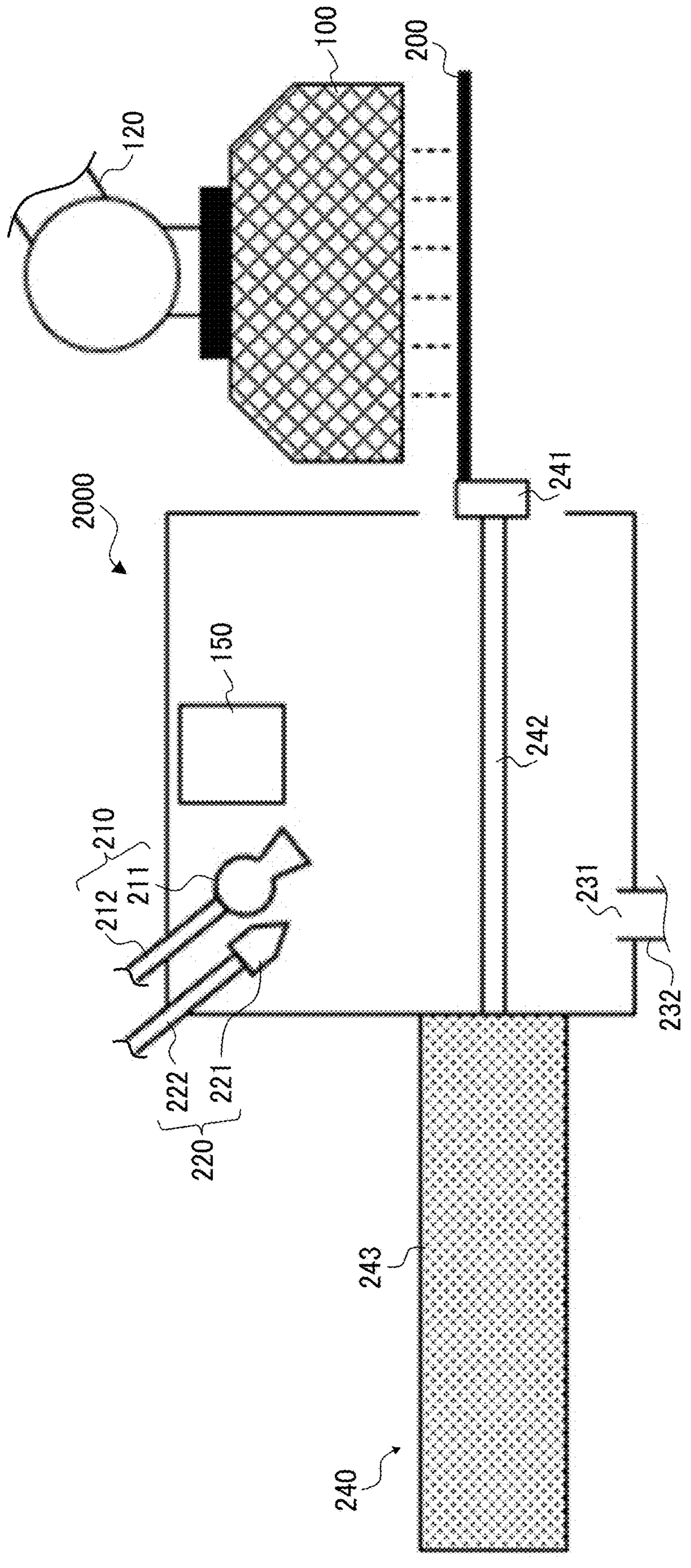
FIG. 11 is a schematic view of the maintenance device according to a sixth embodiment of the present disclosure.

FIG. 11 is a schematic view of the maintenance device 2000 according to a sixth embodiment of the present disclosure. In the sixth embodiment, the camera sensor 150 is disposed inside the maintenance device 2000. With this configuration, the camera sensor 150 having the waterproof structure against the cleaning liquid can capture an image in the closed space of the maintenance device 2000, and thus the illumination condition is stabilized, which may cause an advantage in imaging quality. The cleaning liquid nozzle 211 and the air nozzle 221 may be installed obliquely with respect to the medium plate 200 as illustrated in FIG. 11, which may cause an advantage in removing the residual liquid depending on the layout inside the maintenance device 2000.

Seventh Embodiment

Figure 12:
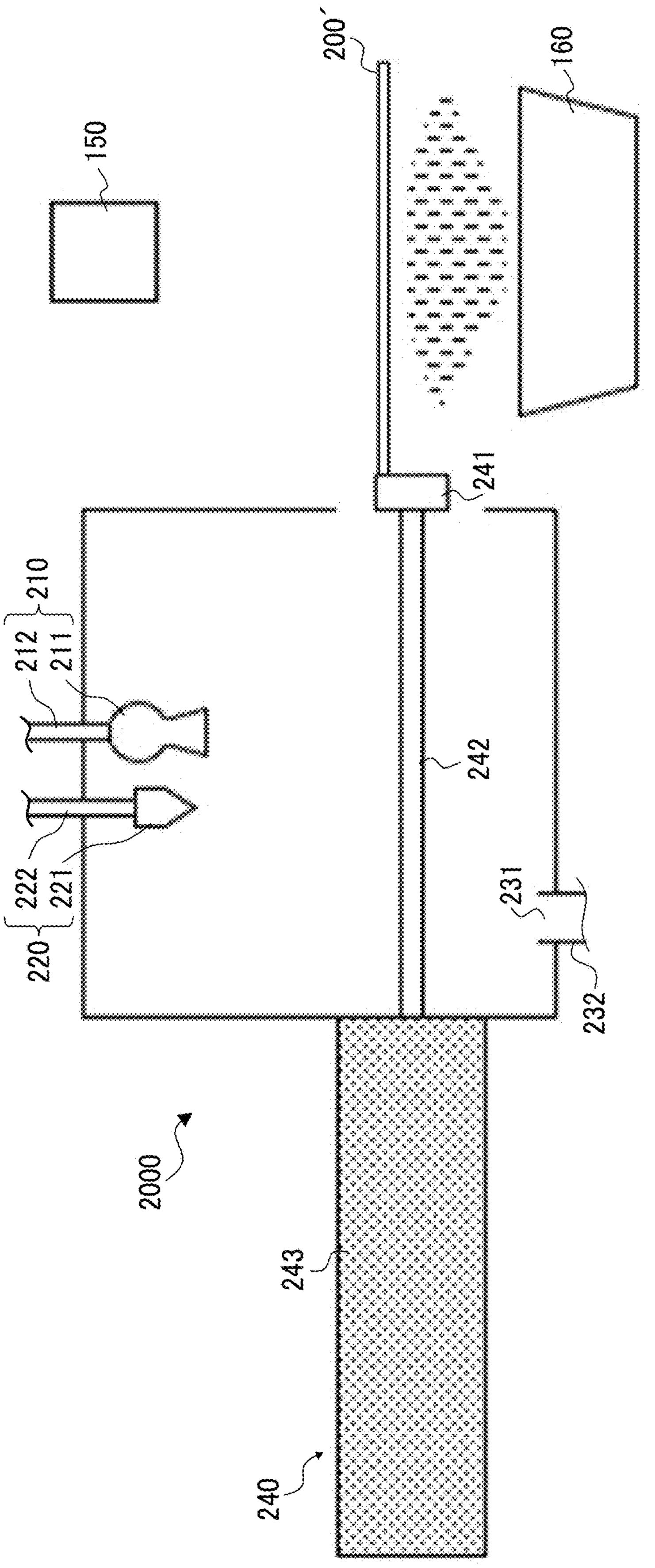
FIG. 12 is a schematic view of the maintenance device according to a seventh embodiment of the present disclosure.

FIG. 12 is a schematic view of the maintenance device 2000 according to a seventh embodiment of the present disclosure. In the seventh embodiment, a medium plate 200' made of a transparent material such as glass is used instead of the medium plate 200. In this configuration, a light source 160 is preferably disposed below the medium plate 200' and irradiates the medium plate 200' with light to enhance imaging condition of the test pattern Pt by the camera sensor 150. When the explosionproof structure is unnecessary in the coating apparatus 3000, the medium plate 200' may be made of a combustible material such as resin.

Eighth Embodiment

Figure 13A:
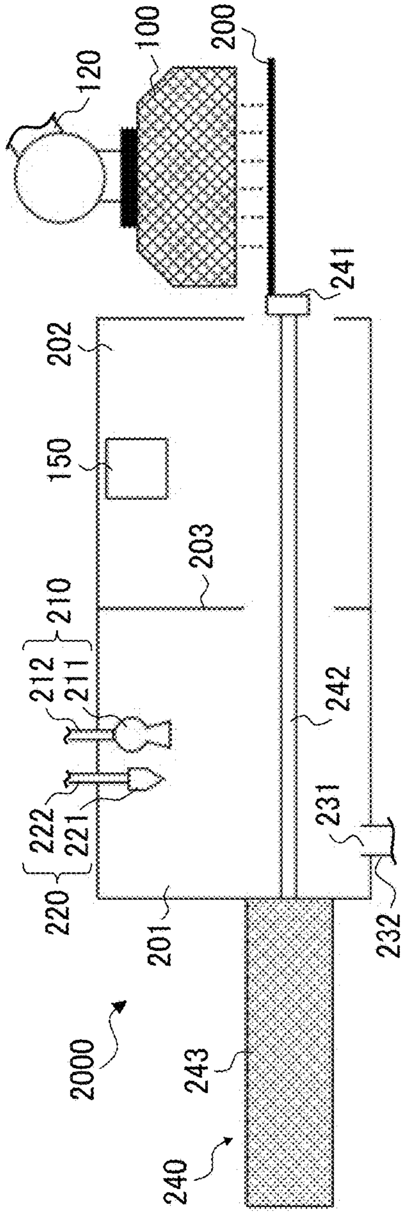
FIGS. 13A to 13C are schematic views of the maintenance device according to an eighth embodiment of the present disclosure.
Figure 13B:
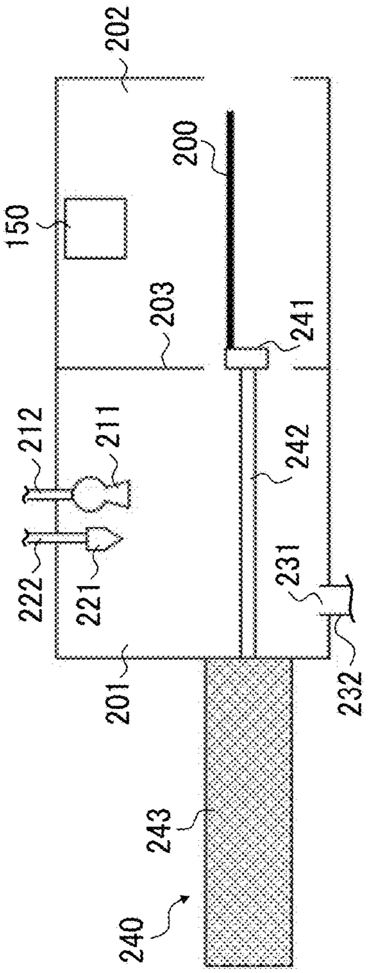
Figure 13C:
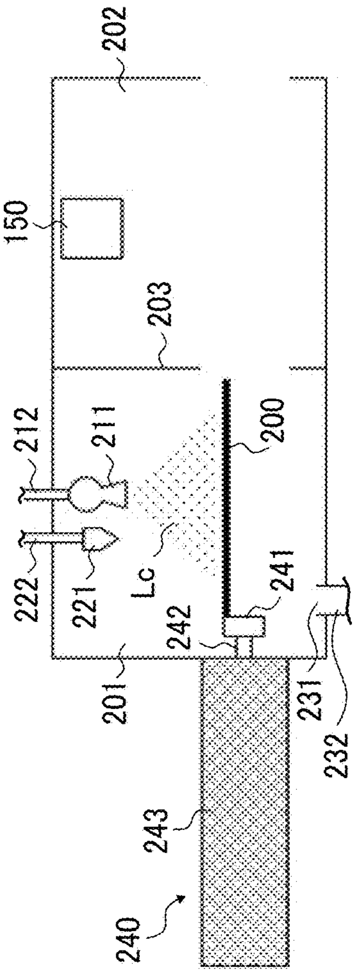

FIGS. 13A to 13C are schematic views of the maintenance device 2000 according to an eighth embodiment of the present disclosure. In the eighth embodiment, the inside of the maintenance device 2000 is partitioned into two chambers 201 and 202 by a partition 203. The cleaning liquid nozzle 211 and the air nozzle 221 are disposed in one chamber 201 to clean the medium plate 200. The camera sensor 150 is disposed in the other chamber 202 to capture an image indicating the moving state, the cleaning state, or the drying state of the medium plate 200.

With this configuration, since the chamber 201 for cleaning the medium plate 200 and the chamber 202 for capturing an image are separated by the partition 203, the camera sensor 150 without the waterproof structure against the cleaning liquid can be used unlike the sixth embodiment described above, and the illumination condition for capturing an image can be further stabilized.

In the eighth embodiment, the position at which the medium plate 200 is exposed to the outside of the maintenance device 2000 is the position at which the test pattern Pt is formed on the medium plate 200 and is an example of the "discharge position." The position at which the medium plate 200 is retracted in the one chamber 201 in the maintenance device 2000 is the position at which the test pattern Pt is removed from the medium plate 200 and is an example of the "cleaning position." The position at which the medium plate 200 is retracted in the other chamber 202 in the maintenance device 2000 is a position at which the camera sensor 150 captures an image of the test pattern Pt formed on the medium plate 200 and is an example of a "third position" or a "detection position."

Ninth Embodiment

Figure 14:
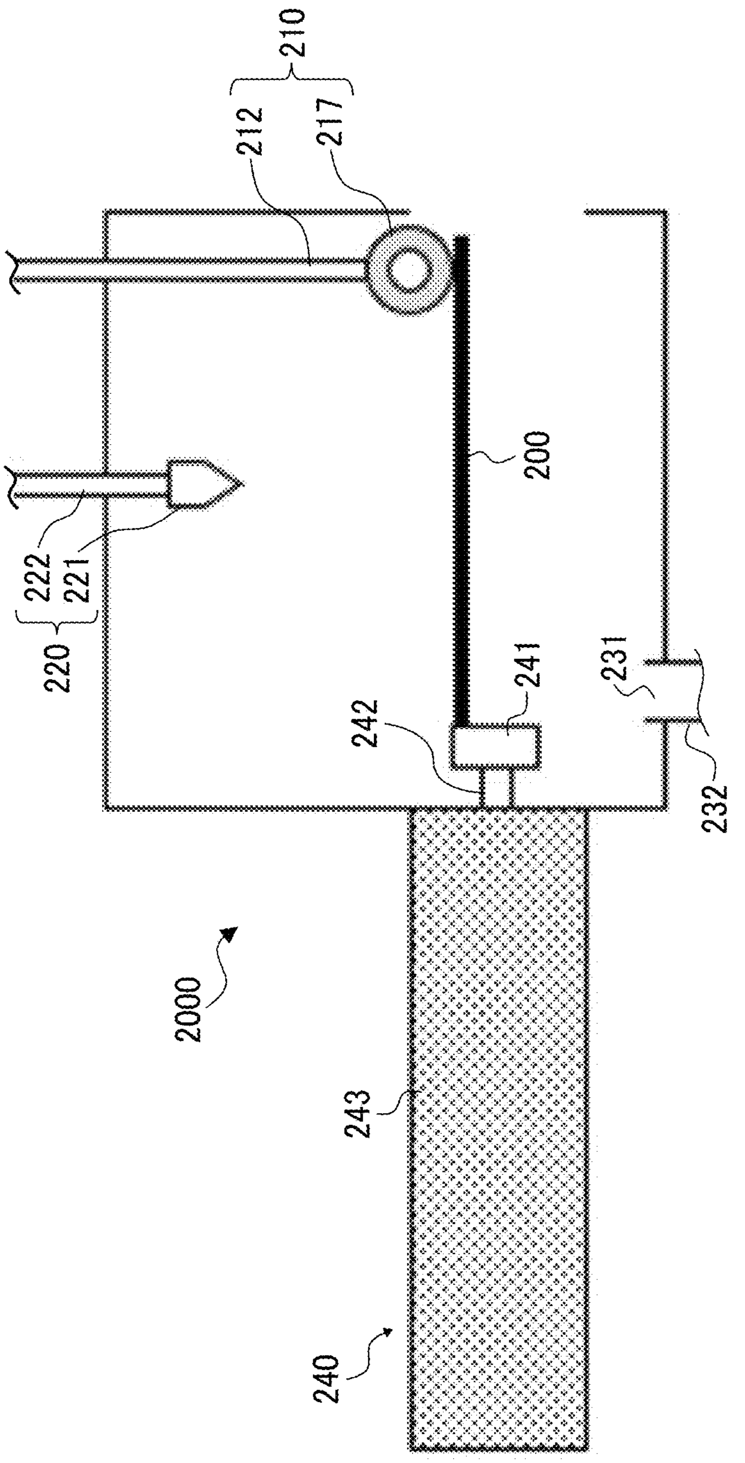
FIG. 14 is a schematic view of the maintenance device according to a ninth embodiment of the present disclosure.

FIG. 14 is a schematic view of the maintenance device 2000 according to a ninth embodiment of the present disclosure. The ninth embodiment is different from the fourth embodiment in that the cleaning-liquid-impregnated component 217 having a rotatable roller shape is used instead of the cleaning-liquid-impregnated component 214. The term "roller shape" includes not only a roller having a substantially smooth outer circumferential surface but also a brush roller having a brush formed in the roller shape.

The cleaning-liquid-impregnated component 214 having a fixed structure that is stationary (i.e., a component that does not rotate) as in the fourth embodiment or the cleaning-liquid-impregnated component 217 that is rotatable as in the ninth embodiment is selected in view of a specification of the coating apparatus 3000 such as the explosionproof structure.

Modification

Figure 15:
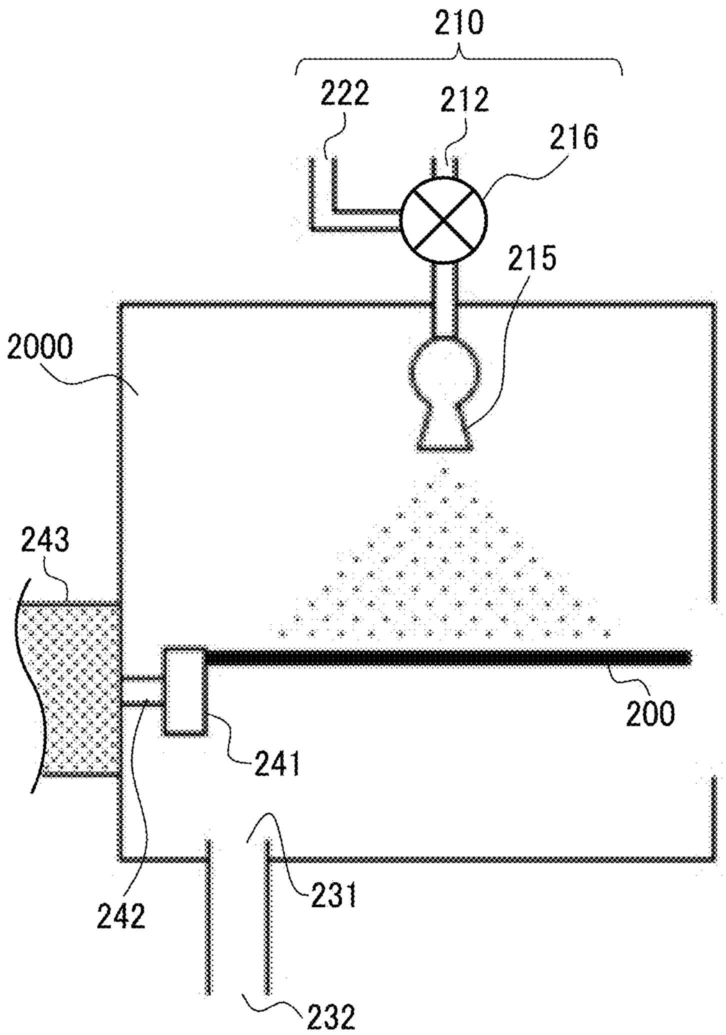
FIG. 15 is a schematic view of the maintenance device according to a modification of the present disclosure.

FIG. 15 is a schematic view of the maintenance device 2000 according to a modification of the present disclosure. In the first to third and sixth to eighth embodiments, the cleaning liquid nozzle 211 for spraying the cleaning liquid and the air nozzle 221 for blowing air are respectively provided, but for example, as illustrated in FIG. 15, the same nozzle may be used as the cleaning liquid nozzle 211 and the air nozzle 221. The cleaning liquid supply path 212 or the air supply path 222 is connected to a common nozzle 215 via a switching valve 216 which is an example of a switch. The common nozzle 215 is an example of a fluid nozzle.

As described above, the removal device includes the common nozzle 215, the cleaning liquid supply path 212 through which the cleaning liquid is supplied to the common nozzle 215, the air supply path 222 through which air is supplied to the common nozzle 215, and the switching valve 216 to switch between the cleaning liquid supply path 212 and the air supply path 222 to connect with the common nozzle 215. As a result, the configuration around the common nozzle 215 in the maintenance device 2000 is simplified, thereby reducing the size and cost of the maintenance device 2000.

The above-described embodiments are examples, and the following aspects of the present disclosure can provide, for example, advantageous effects described below.

Aspect 1

According to Aspect 1, a liquid discharge apparatus (e.g., the coating apparatus 3000) includes a head 100 (an example of a liquid discharge head), a medium plate 200 (an example of a second medium), and a cleaning mechanism 210 (an example of a cleaner). The head 100 discharges ink (an example of a liquid) on the object 5000 (an example of a first medium). The medium plate 200 (the second medium) is different from the first medium. The head 100 is dischargeable the liquid onto the medium plate 200 to form a test pattern Pt. The cleaning mechanism 210 cleans the medium plate 200 to remove the test pattern Pt from the medium plate 200.

Aspect 2

According to Aspect 2, in Aspect 1, the cleaning mechanism 210 includes a cleaning liquid nozzle 211 (an example of a cleaning nozzle) that sprays a cleaning liquid to the medium plate 200 to clean the medium plate 200.

Aspect 3

According to Aspect 3, in Aspect 2, the liquid discharge apparatus further includes a drying mechanism 220 (an example of a dryer) that dries the medium plate 200 cleaned by the cleaning mechanism 210.

Aspect 4

According to Aspect 4, in Aspect 1, the liquid discharge apparatus further includes a medium plate moving mechanism 240 (an example of a moving device) that moves the medium plate 200 between a discharge position at which the head 100 discharges the liquid onto the medium plate 200 and a cleaning position at which the cleaning mechanism 210 cleans the medium plate 200.

Aspect 5

According to Aspect 5, in Aspect 4, the medium plate moving mechanism 240 includes an air cylinder 248 (an example of a linear-motion power cylinder) to linearly move the medium plate 200 between the discharge position and the cleaning position.

Aspect 6

According to Aspect 6, in Aspect 4, the medium plate moving mechanism 240 includes a rotary actuator 247 to rotate the medium plate 200.

Aspect 7

According to Aspect 7, in Aspect 2, the head 100 has nozzles 102 (an example of nozzles) from which the liquid is discharged and a nozzle face 101 (an example of a nozzle surface) on which the nozzles 102 are formed. The cleaning liquid nozzle 211 sprays the cleaning liquid onto a surface of the medium plate 200 and the nozzle face 101 of the head 100.

Aspect 8

According to Aspect 8, in Aspect 1, the cleaning mechanism 210 includes a cleaning-liquid-impregnated component 214 or 217 (an example of an impregnated component) impregnated with the cleaning liquid. The cleaning mechanism 210 causes the cleaning-liquid-impregnated component 214 or 217 to contact a surface of the medium plate 200.

Aspect 9

According to Aspect 9, in Aspect 3, the drying mechanism 220 includes an air nozzle 221 (an example of an air nozzle) to blow air onto a surface of the medium plate 200.

Aspect 10

According to Aspect 10, in Aspect 1, the cleaning mechanism 210 includes a common nozzle 215 (an example of a fluid nozzle), a cleaning liquid supply path 212 (an example of a supply path) through which the cleaning liquid is supplied to the common nozzle 215, an air supply path 222 (an example of an air supply path) through which air is supplied to the common nozzle 215, and a switching valve 216 (an example of a switch) that switches to connect the common nozzle 215 with one of the cleaning liquid supply path 212 and the air supply path 222.

Aspect 11

According to Aspect 11, in Aspect 2, the liquid discharge apparatus further includes a drain path 232 (an example of a drain path) through which the cleaning liquid cleaned the medium plate 200 is drained.

Aspect 12

According to Aspect 12, in Aspect 3, the drying mechanism 220 includes a cleaning liquid absorber 224 (an example of an absorber) that contacts the medium plate 200 and absorbs the cleaning liquid on the medium plate 200.

Aspect 13

According to Aspect 13, in Aspect 1, the liquid discharge apparatus further includes a head maintenance mechanism 290 (an example of a head maintenance mechanism) that maintains and recovers the liquid discharge head 100.

Aspect 14

According to Aspect 14, in Aspect 13, the cleaning mechanism 210 includes a cleaning liquid nozzle 211 (an example of a cleaning nozzle) to spray a cleaning liquid to the medium plate 200 to clean the medium plate 200, an air nozzle 221 (an example of an air nozzle) to blow air onto a surface of the medium plate 200, a cleaning liquid supply path 212 (an example of a supply path) through which the cleaning liquid is supplied to the cleaning liquid nozzle 211, a drain path 232 (an example of a drain path) through which the cleaning liquid cleaned the medium plate 200 is drained, and an air supply path 222 (an example of an air supply path) through which the air is supplied to the air nozzle 221. The cleaning mechanism 210 and the head maintenance mechanism 290 share at least one of the cleaning liquid nozzle 211, the air nozzle 221, the cleaning liquid supply path 212, the drain path 232, or the air supply path 222 to clean both of the head 100 and the medium plate 200.

Aspect 15

According to Aspect 15, in Aspect 1, the liquid discharge apparatus further includes a detector (e.g., the camera sensor 150) that detects the test pattern Pt formed on the medium plate 200 (an example of the second medium) and a controller 9000 (an example of circuitry) that drives the liquid discharge head 100 to discharge the liquid onto the object 5000 (the first medium) in accordance with the test pattern Pt on the medium plate 200 detected by the detector.

Aspect 16

According to Aspect 16, in Aspect 15, the detector includes a camera sensor 150 that captures an image indicating a moving state, a cleaning state, or a drying state of the medium plate 200 (an example of the second medium).

Aspect 17

According to Aspect 17, in Aspect 4, the liquid discharge apparatus further includes a detector (e.g., the camera sensor 150) that detects the test pattern Pt formed on the medium plate 200 (an example of the second medium). The medium plate moving mechanism 240 (an example of the moving device) further moves the medium plate 200 to a detection position at which the detector detects the test pattern Pt on the medium plate 200. The detection position is between the discharge position and the cleaning position.

Aspect 18

According to Aspect 18, in Aspect 4, the medium plate moving mechanism 240 (an example of the moving device) includes a robot arm.

Aspect 19

According to Aspect 19, in Aspect 8, the liquid discharge apparatus further includes a medium plate moving mechanism 240 (an example of a moving device) to move the medium plate 200. The cleaning-liquid-impregnated component 214 is stationary. The medium plate moving mechanism 240 causes the medium plate 200 to contact the cleaning-liquid-impregnated component 214.

There are other aspects as follows.

In Aspect 1, the medium plate 200 (an example of the second medium) includes a metal plate, a glass plate, or a resin plate.

In Aspect 2, the cleaning liquid includes pure water, an aqueous cleaning liquid, a solvent, or a mixture thereof.

In Aspect 4, the medium plate moving mechanism 240 (an example of the moving device) includes an actuator using an electric motor.

In Aspect 19, at least a portion of the cleaning-liquid-impregnated component 214 that contacts the medium plate 200 is a blade.

In Aspect 8, the cleaning-liquid-impregnated component 217 is a rotatable component that contacts the surface of the medium plate 200 (an example of the second medium).

A liquid discharge method performed by the above-described liquid discharge apparatus can provide operational effects equivalent to those of the above-described liquid discharge apparatus.

As described above, according to the present disclosure, the second medium on which the test pattern is formed can be reused, resulting in cost saving.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:
- a liquid discharge head configured to discharge a liquid on a first medium;
- a second medium different from the first medium, the second medium onto which the liquid discharge head is dischargeable the liquid to form a test pattern;
- a cleaner configured to clean the second medium to remove the test pattern from the second medium; and
- a mover configured to move the second medium between
  - a discharge position at which the liquid discharge head discharges the liquid onto the second medium; and
  - a cleaning position at which the cleaner cleans the second medium,
- wherein the cleaner includes a cleaning nozzle configured to spray a cleaning liquid to the second medium to clean the second medium, the cleaning nozzle laterally fixed in a position above the second medium, and
- wherein the mover includes a linear motion power cylinder configured to linearly move the second medium between the discharge position and the cleaning position.

2. The liquid discharge apparatus according to claim 1, further comprising a dryer configured to dry the second medium cleaned by the cleaner.

3. The liquid discharge apparatus according to claim 2,
- wherein the dryer includes an air nozzle configured to blow air onto a surface of the second medium.

4. The liquid discharge apparatus according to claim 2,
- wherein the dryer includes an absorber configured to contact the second medium and absorb the cleaning liquid on the second medium.

5. The liquid discharge apparatus according to claim 1,
- wherein the cleaner includes an impregnated component impregnated with the cleaning liquid, and
- the cleaner causes the impregnated component to contact a surface of the second medium.

6. The liquid discharge apparatus according to claim 5, further comprising the mover configured to move the second medium,
- wherein the impregnated component is stationary, and
- the mover is configured to move the second medium to cause the second medium to contact the impregnated component.

7. The liquid discharge apparatus according to claim 1,
- wherein the cleaner includes:
  - the cleaning nozzle being a fluid nozzle;
  - a supply path configured to supply the cleaning liquid to the fluid nozzle;
  - an air supply path configured to supply air to the fluid nozzle; and
  - a switch configured to switch to connect the fluid nozzle with one of the supply path and the air supply path.

8. The liquid discharge apparatus according to claim 1, further comprising a drain path configured to drain the cleaning liquid from the second medium.

9. The liquid discharge apparatus according to claim 1, further comprising a head cleaner configured to maintain and recover the liquid discharge head.

10. The liquid discharge apparatus according to claim 9,
- wherein the cleaner configured to clean the second medium includes:
  - an air nozzle configured to blow air onto a surface of the second medium;
  - a supply path configured to supply the cleaning liquid to the cleaning nozzle;
  - a drain path configured to drain the cleaning liquid from the second medium; and
  - an air supply path configured to supply the air to the air nozzle, and
- the cleaner configured to clean the second medium and the head cleaner share at least one of the cleaning nozzle, the air nozzle, the supply path, the drain path, or the air supply path to clean both of the liquid discharge head and the second medium.

11. The liquid discharge apparatus according to claim 1, further comprising:
- a detector configured to detect the test pattern formed on the second medium; and
- circuitry configured to drive the liquid discharge head to discharge the liquid onto the first medium in accordance with the test pattern on the second medium detected by the detector.

12. The liquid discharge apparatus according to claim 11,
- wherein the detector includes a camera sensor configured to capture an image indicating a moving state, a cleaning state, or a drying state of the second medium.

13. The liquid discharge apparatus according to claim 1, further comprising a detector configured to detect the test pattern formed on the second medium, wherein the mover further is configured to move the second medium to a detection position at which the detector detects the test pattern on the second medium, and the detection position is between the discharge position and the cleaning position.

14. A liquid discharge apparatus comprising:

a liquid discharge head configured to discharge a liquid on a first medium;

a second medium different from the first medium, the second medium onto which the liquid discharge head is dischargeable the liquid to form a test pattern;

a cleaner configured to clean the second medium to remove the test pattern from the second medium; and a mover configured to move the second medium between a discharge position at which the liquid discharge head discharges the liquid onto the second medium; and a cleaning position at which the cleaner cleans the second medium, wherein the cleaner includes a cleaning nozzle configured to spray a cleaning liquid to the second medium to clean the second medium, the cleaning nozzle laterally fixed in a position above the second medium, and wherein the mover includes a robot arm.

15. A liquid discharge apparatus comprising:

a liquid discharge head configured to discharge a liquid on a first medium;

a second medium different from the first medium, the second medium onto which the liquid discharge head is dischargeable the liquid to form a test pattern, the liquid discharge head including a detector configured to detect a moving state of the second medium;

a cleaner configured to clean the second medium to remove the test pattern from the second medium;

a mover configured to move the second medium between:

a discharge position at which the liquid discharge head discharges the liquid onto the second medium, and a cleaning position at which the cleaner cleans the second medium; and a controller configured to control the liquid discharge head, the cleaner, and the mover based on a detection result of the detector.

* * * * *